Feb. 26, 1957    A. STEITZ, JR    2,783,190
METHOD FOR PURIFICATION OF ALCOHOLS
Filed Sept. 17, 1951
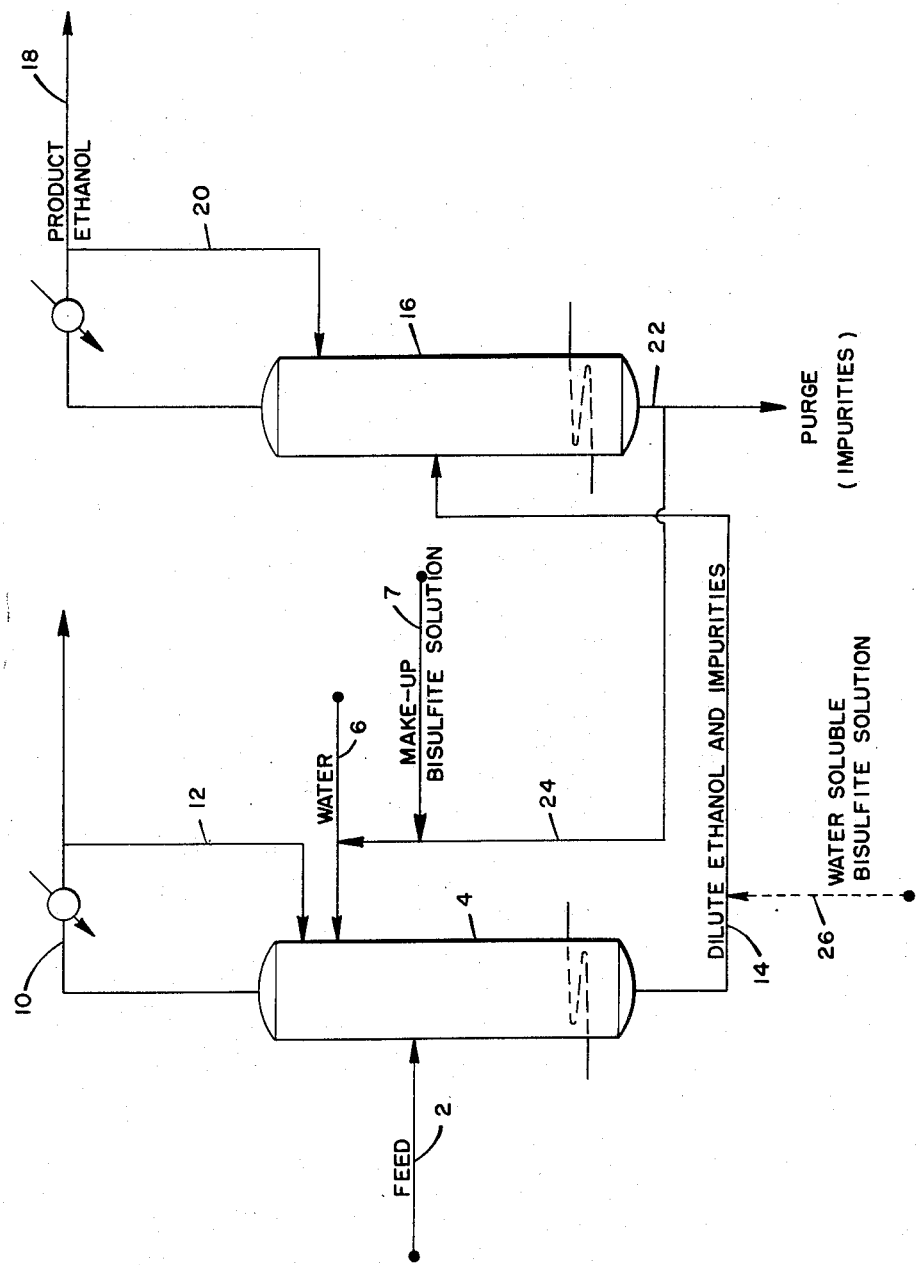
INVENTOR.
ALFRED STEITZ, JR.
BY
ATTORNEY

United States Patent Office 2,783,190
Patented Feb. 26, 1957

2,783,190

METHOD FOR PURIFICATION OF ALCOHOLS

Alfred Steitz, Jr., Tulsa, Okla., assignor to Stanolind Oil and Gas Company, Tulsa, Okla., a corporation of Delaware Application September 17, 1951, Serial No. 247,015

15 Claims. (Cl. 202—39.5)

The present invention relates to the purification of alcohols and more particularly, it pertains to a procedure for the removal of oxidizable contaminants therefrom.

It is known that synthetically or biochemically produced alcohols generally possess certain oxidizable contaminants, the last traces of which are substantially impossible to remove even by means of highly efficient fractionating columns. The presence of such contaminants is highly objectionable where alcohols containing these impurities are employed in the preparation of film-forming compositions because of the fact that, on standing, the resulting film tends to discolor. Moreover, these contaminants, under ordinary conditions, oxidize to produce compounds having a disagreeable odor and which impart undesirable properties to the alcohol. Ethanol containing these oxidizable contaminants is likewise exceedingly undesirable for use as a fortification or blending agent in the manufacture of alcoholic beverages owing to the characteristic disagreeable odor and flavor which such contaminants impart thereto. Because of the obvious advantages of alcohols which have these undesirable contaminants removed, it has long been the desire of alcohol manufacturers to find an economical and efficient method for accomplishing this object. This is especially true in the case of ethanol, where spirit grade alcohol, i. e., ethanol having a permanganate time of at least 45 minutes, commands premium prices.

In U. S. Patent 1,987,601, granted to J. P. Burke, it has been proposed to remove contaminants such as aldehydes from alcohols of the type included within the scope of the present invention, for example, by refluxing a mixture of the crude alcohol with an acid salt of a primary amine such as ethylamine or aniline so that the amine may react with the aldehydes present and thereafter recovering a distillate of alcohol having a substantially reduced concentration of aldehydes. While the foregoing procedure may render alcohols suitable for numerous uses, it is wholly ineffective to yield alcohols of the spirit grade variety.

I have now discovered that alcohols of extremely high purity and relatively long permanganate times can be obtained by treating the contaminated alcohol, especially contaminated dilute aqueous solutions thereof, i. e., containing, for example, from about 3 to 25 weight percent alcohol, with a solution of a suitable water-soluble bisulfite compound. After adding the solution of water soluble bisulfite to the alcohol to be treated, the resulting mixture is distilled to obtain the pure alcohol or an aqueous azeotropic mixture thereof leaving a residue in the still of a relatively nonvolatile product formed by the interaction of the bisulfite with the contaminants. I have further found that the pH of the bisulfite solution employed should be maintained at a level of from about 6.0 to about 8.0, for example, from about 6.5 to 7.5 and preferably from about 6.5 to about 7.0. With bisulfite solutions having a pH below 6.0 sulfur dioxide tends to form during the distillation operation and is carried over into the alcohol distillate. Such distillates are objectionable, however, because of the fact that they readily reduce permanganate. At pH values above 8.0 the quantity of bisulfite present in solution is so small that removal of the undesirable contaminants in the alcohol becomes extremely difficult.

Bisulfite solutions of the type contemplated by my invention are also useful in removing objectionable impurities from dilute solution of alcohols wherein separation of such alcohols is effected by means of extractive distillation procedures. Thus, in U. S. Patent No. 2,607,719, by T. Q. Eliot et al. a procedure is described whereby ethanol is separated from an aqueous solution of non-acid water soluble chemicals of the type produced in conventional hydrocarbon synthesis. But the ethanol obtained as bottoms, in accordance with the procedure described in the aforesaid patent, contains objectionable impurities which materially reduce the permanganate time of the product. I have found, however, that by adding to the ethanol thus produced, a solution of a water soluble bisulfite compound having the proper pH and distilling the resulting mixture, high quality spirit grade ethanol with a permanganate time of 40 to 45 minutes can be obtained. I have further observed that while the bisulfite solutions I employ react with the saturated aldehydes and/or ketones as well as the other objectionable oxidizable contaminants present therein which are not detectable by the fuchsin test, the complexes formed from the aldehydes are readily decomposed under the conditions of pH and temperature utilized. The products formed by the reaction of the bisulfite with the aforesaid oxidizable contaminants, on the other hand, are not decomposed on distillation of the treated ethanol but are withdrawn from the system as the principal component of the still residue thus produced. The fact that the saturated aldehyde-bisulfite complexes decompose under the conditions which I employ makes bisulfite solutions of the type contemplated by my invention ideally suited for continuous methods involving the purification of alcohols by means of extractive distillation. Thus, in utilizing my invention in conjunction with a system employed in the purification of ethanol by extractive distillation with water, an aqueous bisulfite solution is introduced at a point near the top of the tower in which the extractive distillation operation is being carried out. The pH of this bisulfite solution, as previously indicated, may range from about 6.0 to about 8.0. In his pH range and at liquid temperatures of from about 80° to about 95° C., the aldehydes and/or ketones present in the resulting liquid fraction do not tend to form stable complexes with the bisulfite and pass off in the overhead along with other volatile impurities. However, the impurities in the alcohol which cannot be detected by the fuchsin aldehyde test form stable complexes and are washed down the column together with the ethanol and excess bisulfite solution. This bottoms fraction is then sent to a second distillation column where pure spirit grade ethanol is obtained as distillate while the bottoms product containing dissolved free bisulfite is recycled back to the extractive distillation tower to effect purification of the ethanol charged to that column. In order to prevent the buildup in the system of the aforesaid stable bisulfite complexes, the bottoms from the second distillation tower should be purged periodically to the extent of from about 5 to 10%. Make-up bisulfite solution having the desired pH may be added as required to the above mentioned recycle stream.

One of the outstanding advantages of the process of my invention resides in the fact that with prior procedures employed for improving the permanganate time of alcohols, the treating agents utilized combined irreversibly with all carbonyl compounds, i. e., aldehydes and ketones present, in addition to the aforesaid oxidizable impurities and hence required the addition of new treating agent with each new batch of alcohol to be purified. In the process of the present invention, however, conditions are provided so that only said oxidizable impurities react irreversibly, the complexes formed with the ketones and/or aldehydes being decomposed under the conditions of the process to yield bisulfite and the respective carbonyl compounds.

The process of my invention is especially applicable to the purification of various water soluble alcohols obtained by the reduction of carbon monoxide with hydrogen over a fluidized promoted iron catalyst at temperatures of 500° to 700° F. and pressures from 150 to 450 p. s. i. g. For example, in obtaining the fraction produced by the aforesaid process, the original water layer, which contains the major portion of the ethanol present, is subjected to a series of distillation and extractive distillation steps to remove the water soluble aliphatic acids, acetaldehyde, propionaldehyde, butyraldehyde, acetone, methyl ethyl ketone, methyl propyl ketone, methanol, and isopropyl alcohol. The original water layer, after the aforesaid materials have been substantially separated therefrom consists essentially of a dilute solution, usually about 5 weight percent of ethanol in water. Such a solution is normally negative to the fuchsin aldehyde test, but the ethanol obtained therefrom still is far below the standard required for a beverage or spirit grade alcohol, having a permanganate time usually not greater than 5 or 6 minutes.

Although I have referred in the present description to the use of bisulfite solutions, strictly speaking, the solutions employed in the process of my invention contain both dissolved sulfite and bisulfite compounds within the pH ranges specified herein. The quantity of treating solution employed may vary and depends largely upon the concentration of alcohol in the solution to be treated. For the majority of cases, however, the concentration of the sulfite and bisulfite compounds utilized in the mixtures of impure alcohol may range from about .01 to about 1.0 weight percent, on a dry basis .03 to .05 weight percent ordinarily being a preferred concentration range.

One embodiment of my invention is shown digrammatically by the accompanying drawing wherein a charging stock comprising essentially an aqueous solution of butyraldehyde, ethyl acetate, methyl ethyl ketone, methyl propyl ketone, isopropanol, and ethanol, together with a quantity of permanganate oxidizable impurities of unknown structure is introduced through line 2 into an intermediate section of column 4 where it is fractionally distilled. The vapors rising through the column encounter a stream of water introduced at the top thereof through line 6. Also contained in the aforesaid stream of water is a water soluble bisulfite in a concentration ranging from about 0.01 to about 1.0 weight percent (dry basis). Bisulfite required by the system is added thereto through line 7. The pH of the resulting solution ranges from about 6.0 to about 8.0. Under these conditions, ethanol together with the aforesaid oxidizable impurities of unknown structure are washed down the column, said impurities being in the form of a relatively heat-stable bisulfite complex. Overhead through line 10 is taken a mixture of butyraldehyde, ethyl acetate, methyl ethyl ketone, methyl propyl ketone, and isopropanol, except for a small portion of this stream which is returned through line 12 to the fractionating column as reflux. The overhead thus obtained is taken to further processing in accordance with procedures outside the scope of this invention. The bottoms in column 4, consisting essentially of aqueous ethanol and water soluble complexes of bisulfite and the aforesaid impurities, is withdrawn through line 14 and transferred to column 16 where an aqueous ethanol azeotrope is removed overhead through line 18. A portion of this overhead is returned to the column through line 20 as reflux. The bottoms from this distillation operation is withdrawn through line 22, a minor portion, i. e., from about 5 to 10 percent thereof, being purged from the system in order to remove said complexes of bisulfite and said oxidizable impurities, with the balance of this stream being returned to column 4 via lines 24 and 6. Alternatively the water soluble bisulfite solution, instead of being added to the system through line 7 as previously mentioned, may be supplied through dotted line 26 which connects with line 14 containing dilute ethanol and impurities. Under such conditions the bisulfite derivative of said impurities is formed in line 14 and in column 16 resulting in said impurities being removed as bottoms, as previously described, with substantially pure product ethanol being recovered overhead.

As previously indicated, any water soluble bisulfite compound may be employed in carrying out the process of my invention; however, the commercially available bisulfites such as, for example, sodium bisulfite, potassium bisulfite, and ammonium bisulfite are generally preferred.

The process of my invention may be further illustrated by the following example in which the marked superiority of water soluble bisulfites over aniline and ethylamine hydrochloride for improving the permanganate time of ethanol is demonstrated.

Example

The aqueous fraction obtained by the synthesis of hydrocarbons from carbon monoxide and hydrogen was first processed to remove essentially all of the ketones, aldehydes, acids and esters. The fraction thus obtained contained about 5 weight percent ethanol; however, no aldehydes could be detected by test with fuchsin. The solution was divided into four 1200 ml. samples after which aniline hydrochloride, ethylamine hydrochloride, and sodium bisulfite were separately added to individual samples, all in the concentrations listed in the table below, and the permanganate time of each sample determined. The fourth sample was run as a control. Ethanol obtained as a result of treatment with sodium bisulfite contained less than one-half part per million of impurities oxidizable by permanganate. Each treated portion was distilled at a reflux ratio ranging from 20 to 40:1 and permanganate times for each 10 ml. of distillate determined. The results obtained are shown below.

| Cut No. | Control | Wt. percent ethylamine hydrochloride 0.064—permanganate time, minutes [1] | Wt. percent aniline hydrochloride 0.1—permanganate time, minutes [1] | Wt. percent sodium bisulfite 0.047—permanganate time, minutes [1] |
| --- | --- | --- | --- | --- |
| 1 | 1 | 7 | 1 | 16 |
| 2 | 1 | 12 | 1 | 41 |
| 3 | 1 | 19 | 1 | 46 |
| 4 | 1 | 10 | 1 | 44 |
| 5 | 3 | 4 | 1 | 39 |
| 6 | 3 | 2 | 8 | 45 |

[1] The permanganate time test consists of treating a 10 ml. sample of alcohol with 0.4 ml. of a 0.02 percent solution of potassium permanganate at 15° C. The time required for reduction of the permanganate, as evidenced by disappearance of the purple color, is then measured. For spirit grade ethanol this time should be from about 40 to 45 minutes.

From the data appearing in the table, it is evident that both aniline and ethylamine are wholly ineffective to improve the permanganate time of alcohol containing extremely small amounts of oxidizable contaminants. On the other hand, it has been demonstrated that water soluble bisulfites of the type contemplated by the present invention are very effective in removing the last traces of the objectionable oxidizable impurities to give ethanol having a sufficiently high permanganate time to meet the requirements of spirit grade alcohol.

While the foregoing example specifically illustrates the applicability of the process of my invention to the purification of alcohol produced during hydrocarbon synthesis, it is to be strictly understood that the aforesaid process is equally applicable to the removal of objectionable contaminants of the type mentioned above from alcohols produced either biochemically or by other methods of synthesis as previously stated herein.

I claim:

1. A method for the purification of an aldehyde-free alcohol negative to the fuchsin aldehyde test but which contains connate impurities oxidizable by permanganate compounds comprising mixing with the impure alcohol a sufficient quantity of an aqueous solution of a water soluble bisulfite compound having a pH of from about 6.0 to about 8.0, said solution consisting essentially of dissolved sulfite and bisulfite compounds, to produce in the resulting mixture a concentration of sulfite and bisulfite compounds corresponding to from about 0.01 to about 1.0 weight percent on a dry basis, whereby a substantially non-volatile stable complex is formed between said impurities and the bisulfite, and thereafter subjecting said mixture to distillation to recover an alcohol product distillate free of said oxidizable impurities.

2. The process of claim 1 in which the water soluble bisulfite added has a pH of from about 6.5 to about 7.0.

3. The process of claim 1 in which sodium bisulfite is the water soluble bisulfite employed.

4. The process of claim 1 in which the alcohol to be purified is in the form of an aqueous solution containing from about 3 to about 25 weight percent of said alcohol.

5. The process of claim 1 in which sufficient bisulfite solution is added to produce in the final mixture a concentration of sulfite and bisulfite compounds corresponding to from about 0.03 to about 0.05 weight percent.

6. In a process whereby an alcohol is recovered from an aqueous mixture of impurities normally associated therewith, including permanganate oxidizable impurities, by subjecting said mixture to extractive distillation with water involving introducing said mixture into a fractional distillation zone, introducing water into said zone countercurrently to the flow of the resulting vaporized mixture and withdrawing as bottoms a relatively dilute aqueous solution of the alcohol which is negative to the fuchsin aldehyde test but which contains permanganate oxidizable impurities, the improvement which comprises removing from said alcohol the aforesaid oxidizable impurities by adding to said bottoms a sufficient quantity of an aqueous solution of a water soluble bisulfite compound having a pH of from about 6.0 to about 8.0, said solution consisting essentially of dissolved sulfite and bisulfite compounds, to produce in the resulting mixture a concentration of sulfite and bisulfite compounds corresponding to from about 0.01 to about 1.0 weight percent on a dry basis, thereafter subjecting said resulting mixture to fractional distillation, collecting as distillate said alcohol substantially free from said oxidizable impurities, and recycling 90 to 95 percent of the bottoms from said last mentioned distillation step containing dissolved free sulfite and bisulfite compounds to said fractional distillation zone where said dissolved compounds countercurrently contact the vapors from the aforesaid aqueous mixture charged to said first-mentioned fractional distillation step.

7. The process of claim 6 in which ethanol is the alcohol to be purified.

8. The process of claim 6 in which ethanol is purified and recovered from a relatively narrow boiling fraction derived from the aqueous stream produced by reaction of hydrogen with carbon monoxide.

9. The process of claim 6 in which the pH of the aqueous sulfite-bisulfite solution ranges from about 6.5 to about 7.0.

10. The process of claim 6 in which sodium bisulfite is the water soluble bisulfite employed.

11. The process of claim 6 in which sufficient bisulfite solution is added to the impure alcohol to produce in the resulting mixture a concentration of sulfite and bisulfite compounds corresponding to from about 0.03 to about 0.05 weight percent.

12. In a process whereby an alcohol is recovered from an aqueous mixture of impurities normally associated therewith, including permanganate oxidizable impurities, by subjecting said mixture to extractive distillation with water involving introducing said mixture into a fractional distillation zone, and introducing water into said zone countercurrently to the flow of the vaporized mixture; the improvement which comprises adding at a point near the upper portion of said zone a sufficient quantity of an aqueous solution of a water soluble bisulfite compound having a pH of from about 6.5 to about 7.5, said solution consisting essentially of dissolved sulfite and bisulfite compounds, to produce in the resulting liquid phase in said zone a concentration of sulfite and bisulfite compounds corresponding to from about .01 to about 1.0 weight percent on a dry basis, withdrawing as bottoms an aqueous solution of said alcohol, dissolved sulfite and bisulfite compounds, and reaction products of bisulfite with said permanganate oxidizable impurities; thereafter subjecting said bottoms to fractional distillation; recovering overhead alcohol substantially free from said oxidizable impurities; withdrawing a bottoms comprising dissolved sulfite and bisulfite compounds; and recycling 90 to 95 per cent of said bottoms to said first-mentioned fractional distillation step at said point near the upper portion thereof.

13. The process of claim 12 in which ethanol is the alcohol from which the permanganate oxidizable impurities are removed.

14. The process of claim 12 in which ethanol is the alcohol from which the permanganate oxidizable impurities are removed and the aqueous mixture in which said ethanol is originally present is a relatively narrow boiling fraction derived from the aqueous stream produced by the reaction of the carbon monoxide with the hydrogen.

15. The process of claim 12 in which sufficient bisulfite solution is added to produce in the resulting liquid phase a concentration of sulfite and bisulfite compounds corresponding to about 0.03 to about 0.05 weight percent.

References Cited in the file of this patent

UNITED STATES PATENTS

| Number | Name | Date |
|---|---|---|
| 112,725 | Lugo | Mar. 14, 1871 |
| 432,198 | Guignard | July 15, 1890 |
| 2,290,442 | Metzl | July 21, 1942 |
| 2,544,562 | Michael | Mar. 6, 1951 |
| 2,551,593 | Gilliland et al. | May 8, 1951 |
| 2,551,625 | Morrell et al. | May 8, 1951 |
| 2,552,513 | Blanchard | May 15, 1951 |
| 2,555,553 | Michael | June 5, 1951 |
| 2,607,719 | Eliot | Aug. 19, 1952 |
| 2,631,970 | Barnes | Mar. 17, 1953 |
| 2,635,074 | Steitz | Apr. 14, 1953 |

OTHER REFERENCES

Shriner and Fuson: "Identification of Organic Compounds," second edition, pub. 1940 by John Wiley and Sons, pp. 38, 39 and 40.

Fuson and Snyder: "Organic Chemistry," pub. 1942 by John Wiley and Sons, pp. 68–73, 77–80.

United States Pharmacopeia, 13th edition, pp. 19 and 20.